(12) United States Patent
Yu et al.

(10) Patent No.: US 10,212,093 B2
(45) Date of Patent: Feb. 19, 2019

(54) METHOD AND APPARATUS FOR U-PLANE SUB-SERVICE FLOW MAPPING

(71) Applicant: Nokia Technologies Oy, Espoo (FI)

(72) Inventors: Ling Yu, Kauniainen (FI); Matti Einari Laitila, Oulu (FI); Amit Kumar Sharma, Wroclaw (PL); Peter Szilagyi, Budapest (FI); Csaba Vulkan, Budapest (HU)

(73) Assignee: Nokia Technologies Oy, Espoo (FI)

( * ) Notice: Subject to any disclaimer, the term of this patent is extended or adjusted under 35 U.S.C. 154(b) by 128 days.

(21) Appl. No.: 15/480,133

(22) Filed: Apr. 5, 2017

(65) Prior Publication Data
US 2017/0295105 A1   Oct. 12, 2017

Related U.S. Application Data

(60) Provisional application No. 62/320,012, filed on Apr. 8, 2016.

(51) Int. Cl.
| | | |
|---|---|---|
| *H04L 12/833* | (2013.01) | |
| *H04L 12/859* | (2013.01) | |
| *H04W 28/10* | (2009.01) | |
| *H04L 12/851* | (2013.01) | |
| *H04W 28/02* | (2009.01) | |
| *H04W 72/08* | (2009.01) | |

(52) U.S. Cl.
CPC ...... *H04L 47/2483* (2013.01); *H04L 47/2408* (2013.01); *H04L 47/31* (2013.01); *H04W 28/0268* (2013.01); *H04W 72/087* (2013.01)

(58) Field of Classification Search
None
See application file for complete search history.

(56) References Cited

U.S. PATENT DOCUMENTS

| | | |
|---|---|---|
| 8,942,104 B2 | 1/2015 | Jazra et al. |
| 9,237,112 B2 | 1/2016 | Stanwood et al. |
| 2011/0310851 A1* | 12/2011 | Klingenbrunn ..... H04L 47/2491 370/332 |

(Continued)

FOREIGN PATENT DOCUMENTS

WO   2008/015476 A1   2/2008

OTHER PUBLICATIONS

International Search Report and Written Opinion received for corresponding Patent Cooperation Treaty Application No. PCT/FI2017/050242, dated Jun. 21, 2017, 15 pages.

(Continued)

*Primary Examiner* — Duc T Duong
(74) *Attorney, Agent, or Firm* — Nokia Technologies Oy

(57) ABSTRACT

A method, apparatus and computer program product are provided for sub-service flow based mapping in a cellular communication system. A sub-service flow User-plane interface between an Enforcement Point and a network control system (NCS) is defined. Relation and coordination of the sub-service flow User-plane interface associated with sub-service flow management actions on a Control-plane interface is defined. In-band packet marking is created to dynamically assist the identification of sub-service flow identities and receive corresponding quality of service (QoS)/quality of experience (QoE) treatments.

20 Claims, 8 Drawing Sheets

(56) References Cited

U.S. PATENT DOCUMENTS

| | | |
|---|---|---|
| 2013/0203342 A1* | 8/2013 | Morioka ............ H04B 7/15528 455/7 |
| 2014/0078899 A1 | 3/2014 | Zhou |
| 2015/0009826 A1* | 1/2015 | Ma .................... H04W 28/0268 370/235 |
| 2015/0016299 A1 | 1/2015 | Zhang et al. |
| 2015/0098332 A1* | 4/2015 | Eriksson ................. H04L 47/14 370/235 |
| 2016/0248682 A1* | 8/2016 | Lee ....................... H04W 12/08 |
| 2016/0330111 A1* | 11/2016 | Manghirmalani .... H04L 43/028 |
| 2016/0344635 A1* | 11/2016 | Lee ......................... H04L 47/20 |
| 2017/0195245 A1* | 7/2017 | Bhatia ................... H04L 47/626 |
| 2017/0289046 A1* | 10/2017 | Faccin .................... H04L 47/20 |

OTHER PUBLICATIONS

U.S. Appl. No. 62/318,568, "Method and Apparatus for End-To-End Qos/Qoe Management in 5G Systems", filed Apr. 5, 2016, 23 pages.
PCT application No. PCT/US2016/026978, "QoS/QoE enforcement driven Sub-Service Flow (SSF) management in 5G system", filed on Apr. 11, 2016, 26 pages.
U.S. Appl. No. 62/310,523, "Adaptive and Dynamic Qos/Qoe Enforcement", filed Mar. 18, 2016, 35 pages.

\* cited by examiner

METHOD AND APPARATUS FOR U-PLANE SUB-SERVICE FLOW MAPPING

TECHNICAL FIELD

An example embodiment of the invention relates to a Quality of Service ("QoS")/Quality of Experience ("QoE") architecture, such as for 5th generation (5G) wireless communications, and, more particularly relates to a method, apparatus and computer program product for sub-service flow based mapping in a cellular communication system.

BACKGROUND

In addition to today's over-the-top ("OTT") and traditional telecommunication service verticals provided by mobile operators, the 5G Radio Access Network (RAN) systems are expected to support emerging use cases with specific and sometimes critical QoS and QoE requirements such as Internet of Things ("IoT") (including mission critical mobile-to-mobile ("M2M")), vehicle-to-vehicle/infrastructure (V2X) communication, tactile Internet (such as remote factory/robotics control or augmented reality), smart buildings, sensor networks, etc.

In Long-Term Evolution (LTE), granularity of traffic and service differentiation is based on data bearer granularity with pre-configured QoS parameters (such as priority and guaranteed bit rate). Initially, mapping the traffic to data bearers is based on per-flow traffic flow templates (TFTs) (such as internet protocol (IP) addresses, ports and protocols) that may be established and modified through core-RAN and user equipment (UE) network signaling procedures. This makes traffic flow templates difficult to use to target short lived interactive IP flows as they might complete before the TFTs could have been established. Additionally, mapping packets based on TFTs requires a lookup from a TFT table at each packet. Thus, an in-band packet marking is created to carry the sub-service flow (SSF) identity to avoid the need for per-flow SSF identity signaling. As such, with a SSF already established, even the first packet of short lived IP flows may be mapped to the corresponding SSF and receive a corresponding QoS/QoE treatment.

Traditionally, LTE has a low architectural limit on the number of dedicated bearers that may be established for the same UE. This inherently limits the granularity of service differentiation. As such, a flexable number of SSFs and/or real-time adjusable mapping of SSFs to radio buffers and the dynamic programming of the radio buffers to reflect the QoS/QoE requirements of the traffic mix are desired.

Proprietary mechanisms may use in-band signaling, such as packet marking, to attach bearer level QoS information to the User-Plane (U-plane) packets. Existing mechanisms are still acting on the entire traffic mix carried by the bearer. For example, they do not differentiate and manage traffic below the bearer aggregation. As such, a data bearer could be roughly paired with a SF. Moreover, the existing mechanisms are targeting bearer QoS changes, that are executed according to pre-defined static rules, and they lack dynamic intra-bearer traffic separation.

When considering the relations between the SSFs and the bearers, clear differentiation should be made between the role of the data bearers and mechanisms used for mapping packets to bearers. The role of the data bearers may relate to addressing a traffic mix that is to receive a statically pre-configured relative QoS at the radio interface. The mechanism used for mapping packets to bearers may relate to a general packet radio service (GPRS) Tunneling Protocol ("GTP") of a service that can be regarded as an in-band marking interface. The inability of the bearer based QoS architecture to fit for QoE enforcement is not caused by the use of GTP or any kind of packet marking, but the bearer's inflexible granularity of traffic multiplexing (such as practically the whole data traffic of the UE). The inability may also be caused by the static association of the bearer with a limited set of QoS parameters and the shortcomings of the underlying QoS architecture. Conversely, using an in-band mechanism or packet packing to map U-plane packets to a logical multiplexing group does not make the mechanism become a bearer.

SUMMARY

An example embodiment of the present invention introduces a method for specifying the format of the SSF mapping and defining its relation to the Control-Plane (C-plane) interface. An example embodiment of the present invention introduces a method for defining the SSF-U interface between the Enforcement Point and the network control system (NCS), and defining the relation/coordination of the SSF-U interface with the establishment/termination of SSFs on the C-plane (referred to as the SSF-M interface).

In an example embodiment, SSF based traffic separation and QoS/QoE management employs a functionality provided by an Enforcement Point (EP) that dynamically defines the SSF within a SF as well as a mechanism to convey the traffic to SSF mapping information to the radio stack. As the scope of the mapping is to identify the SSF, the mapping may be most efficiently realized through an in-band per packet indication/marking mechanism. In addition, the marking may be efficient in terms of overhead, and need not convey redundant information, such as QoS/QoE information that applies to all packets within the same SSF or SF. On the other hand, the marking may allow the attachment of additional information, beyond the SSF mapping, that applies only to that specific packet. Finally, the marking may also be aligned with the actions associated the SSF management of a Control-Plane (C-plane) interface in order to orchestrate the establishment or termination of new SSFs on the C-plane and their marking on the U-plane.

In an example embodiment, a method is provided that includes determining a SSF identifier (ID) associated with at least a portion of a packet at a User-plane interface between an enforcement point and a network control system. In an example embodiment, the SSF ID comprises information associated with QoS or QoE identities of the packet. A method of this example embodiment also includes mapping the packet to a corresponding radio buffer based on the SSF ID upon detecting a specific application session. The method of this example embodiment also includes relating one or more SSF management actions associated with the packet at a Control-plane interface. As such, a corresponding QoS or QoE treatment of the packet may be received.

In another example embodiment, an apparatus is provided that includes at least one processor and at least one memory including computer program code with the at least one memory and the computer program code configured to, with the processor, cause the apparatus to perform sub-service flow based mapping in a cellular communication system. The at least one memory and the computer program code are also configured to, with the processor, cause the apparatus of this example embodiment to determine a SSF identifier (ID) associated with at least a portion of a packet at a User-plane interface between an enforcement point and a network control system. In an example embodiment, the SSF ID comprises information associated with QoS or QoE identities of the packet. The at least one memory and the computer program code are also configured to, with the processor, cause the apparatus of this example embodiment to map the packet to a corresponding radio buffer based on the SSF ID upon detecting a specific application session. The at least one memory and the computer program code are also configured to, with the processor, cause the apparatus of this example embodiment to relate one or more SSF management actions associated with the packet at a Control-plane interface. As such, a corresponding QoS or QoE treatment of the packet may be received.

In yet another example embodiment, a computer program product is provided that includes at least one non-transitory computer-readable storage medium having computer-executable program code instructions stored therein with the computer-executable program code instructions including program code instructions configured to perform sub-service flow based mapping in a cellular communication system. The computer-executable program code instructions also include program code instructions configured to determine a SSF identifier (ID) associated with at least a portion of a packet at a User-plane interface between an enforcement point and a network control system. In an example embodiment, the SSF ID comprises information associated with QoS or QoE identities of the packet. The computer-executable program code instructions further include program code instructions configured to map the packet to a corresponding radio buffer based on the SSF ID upon detecting a specific application session. The computer-executable program code instructions additionally include program code instructions configured to relate one or more SSF management actions associated with the packet at a Control-plane interface. As such, a corresponding QoS or QoE treatment of the packet may be received.

In a further example embodiment, an apparatus is provided that includes means for determining a SSF identifier (ID) associated with at least a portion of a packet at a User-plane interface between an enforcement point and a network control system. In an example embodiment, the SSF ID comprises information associated with QoS or QoE identities of the packet. An apparatus of this example embodiment also includes means for mapping the packet to a corresponding radio buffer based on the SSF ID upon detecting a specific application session. The apparatus of this example embodiment also includes means for relating one or more SSF management actions associated with the packet at a Control-plane interface. As such, a corresponding QoS or QoE treatment of the packet may be received.

DESCRIPTION OF THE DRAWINGS

Figure 1:
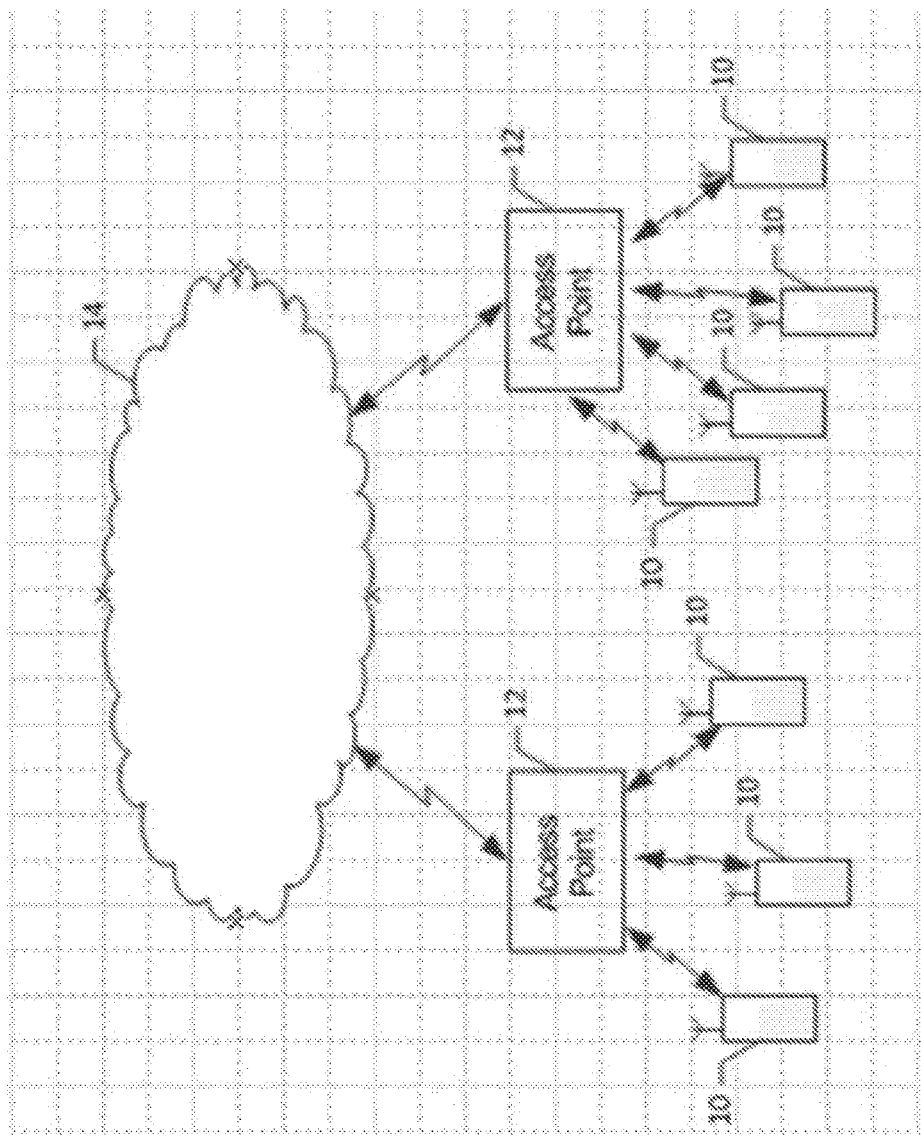
Figure 2:
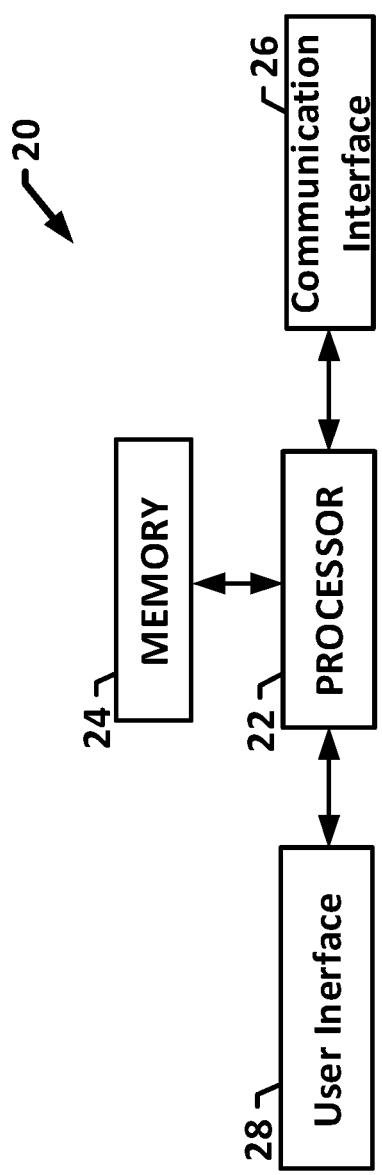
Figure 3:
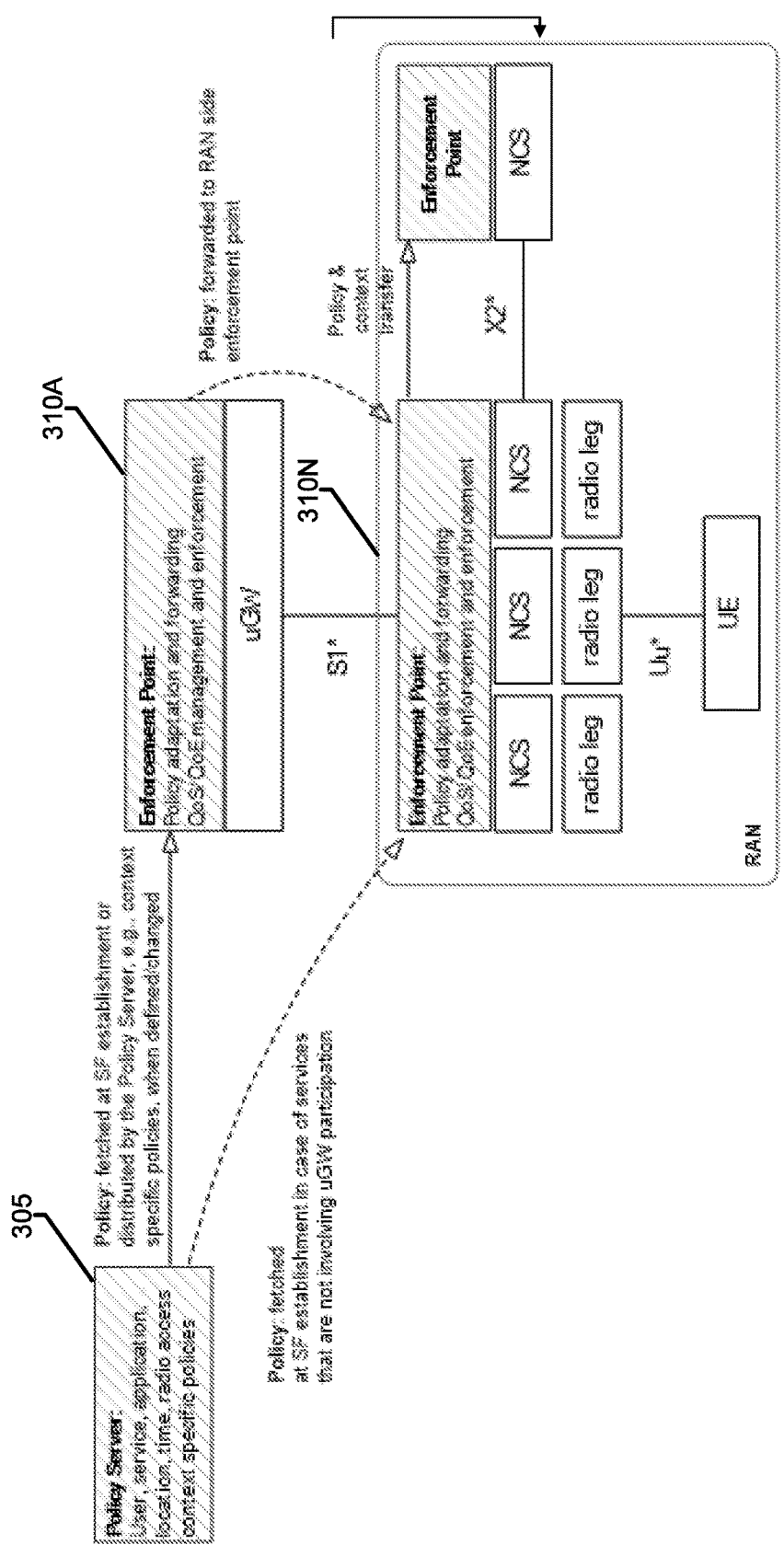
Figure 4:
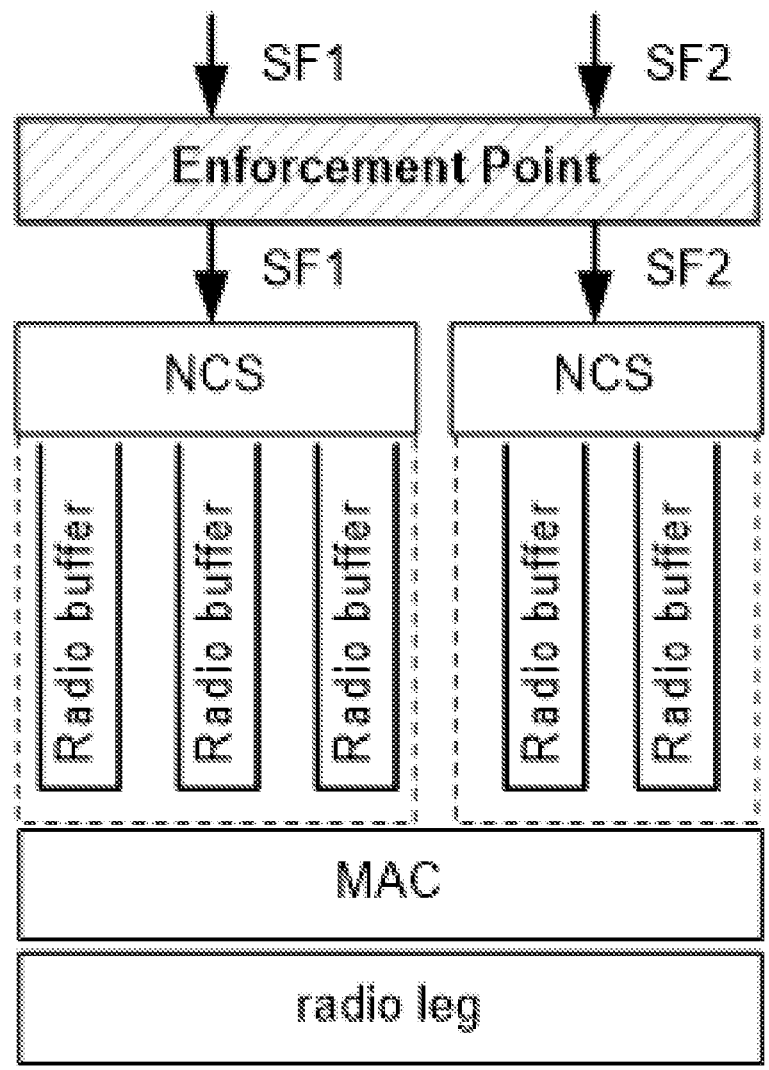
Figure 5:
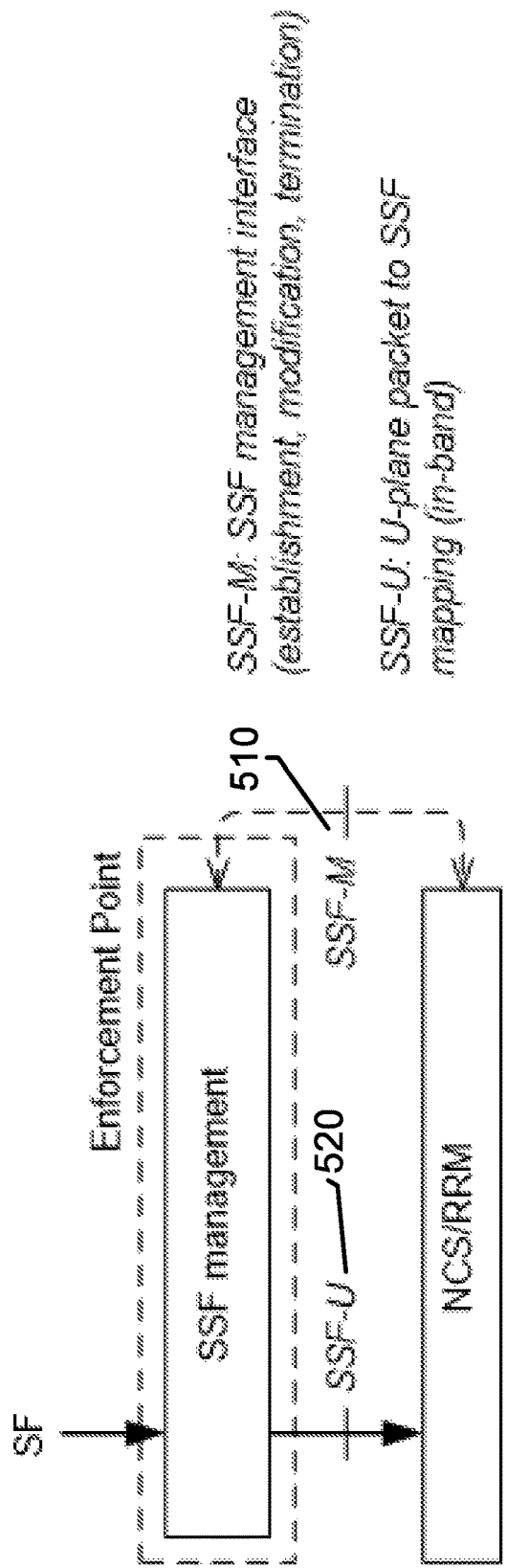
Figure 6:
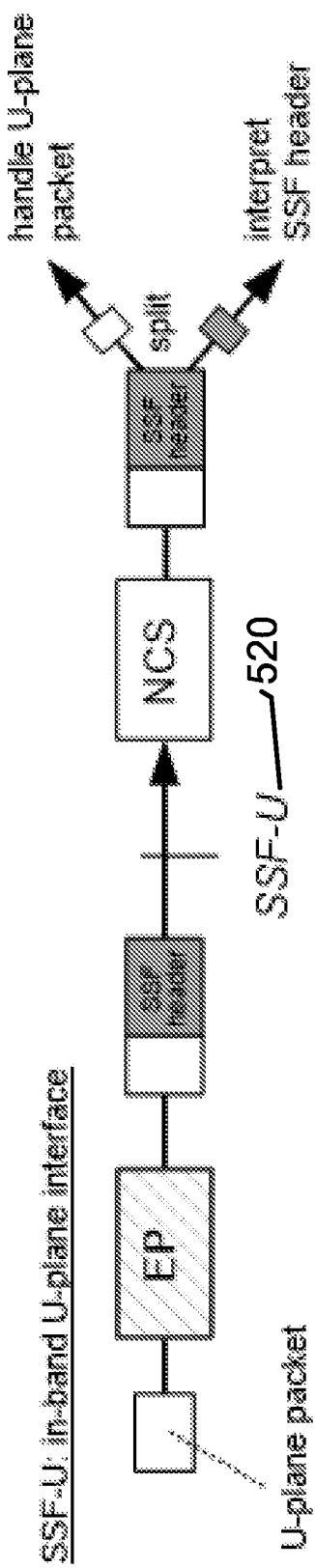
Figure 7:
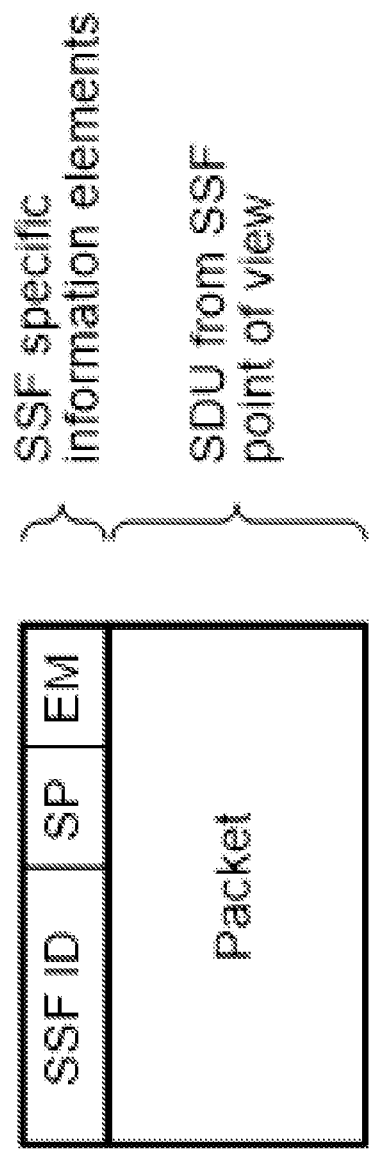
Figure 8:
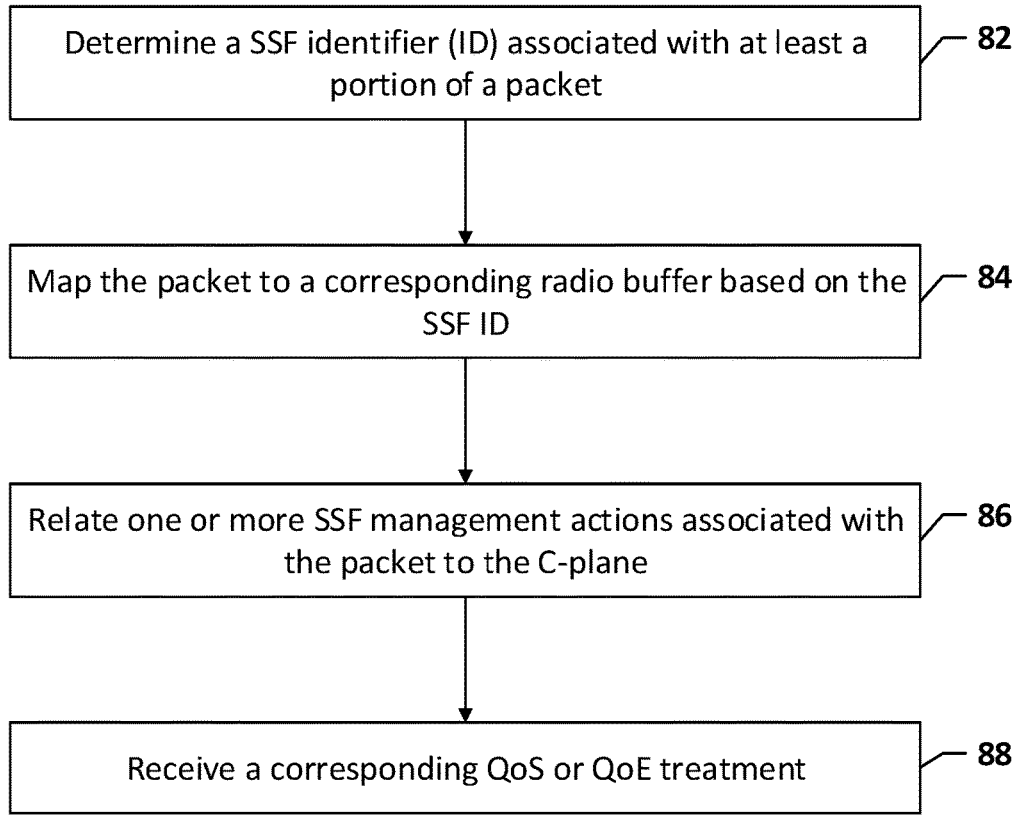

Having thus described certain embodiments of the invention in general terms, reference will now be made to the accompanying drawings, which are not necessarily drawn to scale, and wherein:

FIG. 1 depicts a block diagram of a system that may be specifically configured in accordance with an example embodiment of the present invention;

FIG. 2 depicts a block diagram of an apparatus that may be specifically configured in accordance with an example embodiment of the present invention;

FIG. 3 depicts a block diagram of a system that illustrates communication between the various system components in accordance with an example embodiment of the present invention;

FIG. 4 depicts a block diagram of a system that illustrates service flow establishment in accordance with an example embodiment of the present invention;

FIG. 5 depicts a block diagram of a system that illustrates management interfaces in accordance with an example embodiment of the present invention;

FIG. 6 depicts a block diagram of a system that illustrates sub-service flow interface in accordance with an example embodiment of the present invention;

FIG. 7 depicts a block diagram of a system that illustrates packet coding elements in accordance with an example embodiment of the present invention; and FIG. 8 illustrates an example flowchart illustrating a method of operating an example apparatus in accordance with an embodiment of the present invention.

DETAILED DESCRIPTION OF SOME EXAMPLE EMBODIMENTS

The description was provided by way of exemplary and non-limiting examples a full and informative description of the exemplary embodiment of this invention. However, various modifications and adaptations may become apparent to those skilled in the relevant arts in view of the description, when read in conjunction with the accompanying drawings and the appended claims. However, all such and similar modifications of the teachings of this invention will still fall within the scope of this invention.

Some example embodiments will now be described more fully hereinafter with reference to the accompanying drawings, in which some, but not all embodiments are shown. Indeed, the example embodiments may take many different forms and should not be construed as limited to the embodiments set forth herein; rather, these embodiments are provided so that this disclosure will satisfy applicable legal requirements Like reference numerals refer to like elements throughout. The terms "data," "content," "information," and similar terms may be used interchangeably, according to some example embodiments, to refer to data capable of being transmitted, received, operated on, and/or stored. Moreover, the term "exemplary", as may be used herein, is not provided to convey any qualitative assessment, but instead merely to convey an illustration of an example. Thus, use of any such terms should not be taken to limit the spirit and scope of embodiments of the present invention.

As used herein, the term "circuitry" refers to all of the following: (a) hardware-only circuit implementations (such as implementations in only analog and/or digital circuitry); (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or application specific integrated circuit for a mobile phone or a similar integrated circuit in a server, a cellular network device, or other network device.

Referring now to FIG. 1, which illustrates an example system that supports communications between a plurality of stations 10 and one or more access points 12 (e.g., a high density system scenario where a plurality of access points may be deployed to a geographical area and may be operating on the same frequency channel), each access point may communicate with one or more stations and, in one embodiment, may communicate with a large number of stations, such as 6,000 or more stations. The access points may, in turn, communicate with a network 14. While the access points may communicate via a Long Term Evolution (LTE) or LTE-Advanced (LTE-A) network, other networks may support communications between the access points including those configured in accordance with wideband code division multiple access (W-CDMA), CDMA2000, global system for mobile communications (GSM), general packet radio service (GPRS), the IEEE 802.11 standard including, for example, the IEEE 802.11ah or 802.11ac standard or other newer amendments of the standard, wireless local access network (WLAN), Worldwide Interoperability for Microwave Access (WiMAX) protocols, universal mobile telecommunications systems (UMTS) terrestrial radio access network (UTRAN) and/or the like.

The access points 12 and the stations 10 may communicate via wireline communications, but most commonly communicate via wireless communications. For example, the access points and the stations may communicate in a sub 1 GHz band as defined by IEEE 802.11ah standard or in a 5 GHz band, which may be defined by, for example, IEEE 802.11ac standard. The access point may be embodied by any of a variety of network entities, such as an access point, a base station, a Node B, an evolved Node B (eNB), a radio network controller (RNC), a mobile device/a station (e.g., mobile telephones, smart phones, portable digital assistants (PDAs), pagers, laptop computers, tablet computers or any of the other numerous hand held or portable communication devices, computation devices, content generation devices, content consumption devices, or combinations thereof), or the like. The stations may also be embodied by a variety of devices, such as sensors, meters or the like. The sensors and meters may be deployed in a variety of different applications including in utility applications to serve as a gas meter, a water meter, a power meter or the like, in environmental and/or agricultural monitoring applications, in industrial process automation applications, in healthcare and fitness applications, in building automation and control applications and/or in temperature sensing applications. Stations that are embodied by sensors or meters may be utilized in some embodiments to backhaul sensor and meter data. Alternatively, the stations may be embodied by mobile terminals or user equipment(s) (UE), such as mobile communication devices, e.g., mobile telephones, smart phones, portable digital assistants (PDAs), pagers, laptop computers, tablet computers or any of the other numerous hand held or portable communication devices, computation devices, content generation devices, content consumption devices, or combinations thereof. As the foregoing example illustrate, the term user equipment is intended to cover any suitable type of wireless user equipment including, but not limited to, mobile telephones, portable data processing devices or portable web browsers. In an embodiment in which the station is embodied by a mobile terminal, the communication between an access point and the station may serve to extend the range of Wi-Fi or another wireless local area network (WLAN), such as by extending the range of a hotspot, and to offload traffic that otherwise would be carried by a cellular or other network.

The access point 12 and/or the station 10 may each be embodied as or otherwise include an apparatus 20 that is specifically configured to perform the functions of the respective device, as generically represented by the block diagram of FIG. 2. In an example embodiment, however, the apparatus is embodied by the access point, such as a base station, and, more particularly, by an enforcement point 310, such as by a SSF-U-plane packet interface (SSF-U) 520 as described below. While the apparatus may be employed, for example, by an access point or a station, it should be noted that the components, devices or elements described below may not be mandatory and thus some may be omitted in certain embodiments. Additionally, some embodiments may include further or different components, devices or elements beyond those shown and described herein.

Regardless of the type of device that embodies the station 10, the station 10 may include or be associated with an apparatus 20 as shown in FIG. 2. In this regard, the apparatus may include or otherwise be in communication with a processor 22, a memory device 24, a communication interface 26 and optionally a user interface 28. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

In some embodiments, the processor 22 (and/or co-processors or any other processing circuitry assisting or otherwise associated with the processor) may be in communication with the memory device 24 via a bus for passing information among components of the apparatus. The memory device may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus 20 to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 20 may be embodied by a station 10 or an access point 12 configured to employ an example embodiment of the present invention. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 22 may be configured to execute instructions stored in the memory device 24 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a station 10 or an access point 12) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor. In one embodiment, the processor may also include user interface circuitry configured to control at least some functions of one or more elements of the user interface 28.

Meanwhile, the communication interface 26 may be any means such as a device or circuitry embodied in either hardware or a combination of hardware and software that is configured to receive and/or transmit data between the station 10 and an access point 12. In this regard, the communication interface 26 may include, for example, an antenna (or multiple antennas) and supporting hardware and/or software for enabling communications wirelessly. Additionally or alternatively, the communication interface may include the circuitry for interacting with the antenna(s) to cause transmission of signals via the antenna(s) or to handle receipt of signals received via the antenna(s). For example, the communications interface may be configured to communicate wirelessly, such as via Wi-Fi, Bluetooth or other wireless communications techniques. In some instances, the communication interface may alternatively or also support wired communication. As such, for example, the communication interface may include a communication modem and/or other hardware/software for supporting communication via cable, digital subscriber line (DSL), universal serial bus (USB) or other mechanisms. For example, the communication interface may be configured to communicate via wired communication with other components of the station or access point.

The optional user interface 28 may be in communication with the processor 22, such as the user interface circuitry, to receive an indication of a user input and/or to provide an audible, visual, mechanical, or other output to a user. As such, the user interface may include, for example, a keyboard, a mouse, a joystick, a display, a touch screen display, a microphone, a speaker, and/or other input/output mechanisms. In some embodiments, a display may refer to display on a screen, on a wall, on glasses (e.g., near-eye-display), in the air, etc. The user interface may also be in communication with the memory 24 and/or the communication interface 26, such as via a bus.

As described with reference to FIG. 3, the high level architecture of the QoS/QoE management framework may comprise (1) a central Policy Server ("PS") 305 configured to store the user/service vertical/application and at least some context (location, time, radio access, etc.) specific policies and operator preferences; and (2) Enforcement Points 310A-N that perform QoS/QoE management by dynamically applying/enforcing the policies in the context of the actual user plane traffic, services, applications and network/resource status. Enforcement Points 310A-N may require access to the user plane traffic for collecting user, service, application, network specific insight; for executing actions on the traffic itself; and for controlling the critical user plane system resources (such as radio and core network elements, transport infrastructure and services that can be either physical or virtual ones).

Each Enforcement Point 310A-N may derive its actions from the policies received/retrieved from the policy server 305. On the U-plane, the Enforcement Point handles the traffic of one or more SFs and manages the QoE of each Service Flow. For efficient QoS/QoE management, the Enforcement Points 310A-N may partition the U-plane flows within an SF to SSF. A SSF is corresponding to one SF and it is a logical separation carrying a subset of the SF's traffic that requires dedicated QoS/QoE treatment. SSFs may enable more granular U-plane service/flow differentiation below SF granularity.

FIG. 4 shows the options for one Network Control System ("NCS") entity that is established for each SF on the radio stack. Each NCS entity may have a fixed or pre-defined number of radio buffers with programmable service parameters, such as QoS parameters and/or scheduler disciplines. In order to harmonize the service of U-plane packets through the entire protocol stack, the Enforcement Points 310A-N may communicate SSF related information to the radio stack and it may control which packets are mapped to the available radio buffers.

FIG. 5 illustrates an example of a SSF management interface. Two interfaces are defined between the Enforcement Points 310A-N and the NCS/Radio Resource Management (RRM). SSF-Management (SSF-M) 510 may be associated with the SSF management interface for exchanging SSF management information, such as establishment, modification and/or termination. The SSF-U-plane packet interface (SSF-U) 520 may be a pseudo-interface that indicates the mapping of packets to individual SSFs directly on the U-plane. In one embodiment, this is necessary in order for the Enforcement Points 310A-N to indicate the SSF membership of each packet to the NCS.

The apparatus may, in some cases, be configured to implement an embodiment of the present invention with two alternative approaches to the relation of SFs, SSFs and plurality of U-plane flows such as application sessions. First, each application session belongs to a specific SSF and/or a specific SF. This requires that during SF establishment, a default SSF may be created automatically that acts as a "catch-all" SSF for all traffic that does not require dedicated service within the SF. No special SSF ID may be reserved as each SSF is an explicitly established one. Second, no default SSF is created. As such, traffic may be associated directly with the SF itself. SSFs may be created in case the Enforcement Points 310A-N detect specific application sessions that require dedicated SSF level differentiation. On the NCS layer a default Radio buffer exists that is programmed (by default) to handle all traffic not marked on the SSF-U 520 as belonging to a specific SSF. An SSF ID (e.g., zero) is reserved to refer to the default radio buffer on the SSF-M/-U interfaces.

In some embodiments, the apparatus may be configured to define the SSF-U 520 interface between the Enforcement Points 310A-N and the NCS, and the apparatus may be configured to define the relation or coordination of the SSF-U 520 interface with the establishment or termination of SSFs on the C-plane (referred to as the SSF-M 510 interface).

In one embodiment, the SSF-U 520 may be an in-band U-plane interface, which operates on the U-plane packets as they are passed from the Enforcement Points 310A-N to the NCS. The primary and mandatory goal of the SSF-U 520 is to provide a per-packet tag that indicates the identity of the SSF to which the packet belongs. A secondary or optional goal of the SSF-U 520 is to enable the attachment of additional context information, such as QoS related commands, to the packets.

In one embodiment, the apparatus may provide advantages by using an in-band packet marking to carry the SSF identity to avoid the need for per-flow SSF identity signalling and also to eliminate any lookups based on packet tuples. As such, with an SSF already established, even the first packet of short lived IP flows may be readily mapped to the corresponding SSF and receive a corresponding QoS/QoE treatment. In an embodiment, there is no limit in the number of SSFs, the mapping of SSFs to radio buffers and the programming of the radio buffers are both adjustable in real-time to reflect the QoS/QoE requirements of the traffic mix. In some cases, the SSF-U interface may separate traffic below SF granularity which corresponds to sub-bearer granularity in the context of LTE/HSPA, without aiming at the in-band transmission of SF or SSF level QoS information.

The SSF-U Interface

In some embodiments, there are two approaches towards SSF management. One approach is that all traffic is mapped to an SSF regardless of their requirement for special QoS/QoE treatment, which implies that there may be a default SSF to be used for best effort traffic. As such, the SSF-U 520 is required to carry a SSF ID for each packet. The SSF ID is in all cases allocated by the Enforcement Points 310A-N as part of a SSF establishment procedure. Another approach maps only application sessions with specific QoS/QoE requirements to specific SSFs. As such, the SSF ID is either a special reserved value (not usable for dynamically established SSFs) to indicate that the packet does not belong to any SSF or it is an SSF ID allocated by the Enforcement Points 310A-N during an SSF establishment procedure. In one embodiment, this is only a semantical difference from the first approach that can be handled by the same packet format.

Coordination Between SSF-M and SSF-U

In some embodiments, when the Enforcement Points 310A-N have decided to establish a new SSF, it is possible to autonomously allocate a new SSF ID immediately. The rest of the SSF establishment procedure requires C-plane signalling between the Enforcement Points 310A-N and the NCS. Therefore, the SSF establishment may have a non-zero latency. On the other hand, U-plane packets intended to belong to the new SSF may already be available for transmission at the Enforcement Point towards the radio stack. These packets should not be held back until the SSF establishment signalling is completed. For example, the packets might require low latency. Instead, the Enforcement Points 310A-N may tag the packets with the newly allocated SSF IDs and forward them to the NCS. Since the NCS has no specific information on the treatment of these packets yet (as it would be established during the ongoing SSF establishment procedure), the NCS may map the packets to the default radio buffer. The Enforcement Points 310A-N may reconfigure the service parameters of the default radio buffer so that the compound traffic mix in the default radio buffer, including the existing flows and the packets in the new SSF, receives proper treatment. Once the SSF establishment procedure is complete, the packets that are tagged with the new SSF ID may be moved from the default radio buffer to the buffer assigned to the new SSF and served there according to the specific service parameters defined by the Enforcement Points 310A-N for the new SSF.

U-plane Indication of SSF Termination

In one embodiment, the termination of an SSF is originated by the Enforcement Points 310A-N and requires SSF signalling procedure between the Enforcement Points 310A-N and the NCS. As a complementary action, the Enforcement Points 310A-N may tag the last packet transferred to the radio in the SSF, such as an end marker indication. As such, it enables the radio stack to keep the resources associated with the SSF and continue providing the corresponding service until all packets are successfully transferred to the UE. This capability provides additional coordination between the SSF-M 510 interface (e.g., the management of the SSFs), and the SSF-U 520 (e.g., the in-band U-plane packet interface).

Implementation of SSF-U Interface

As described with reference to FIG. 6, an embodiment of an in-band SSF-U 520 interface is shown. The SSF-U 520 interface may be implemented using a tunnelling mechanism or introducing a specific SSF protocol header attached to the U-plane packets. In either of the tunnelling mechanism or the protocol header mechanism, the SSF specific information may be encoded into the packet header as shown in FIG. 7. For example, logical per-packet SSF information elements may be defined on the SSF-U 520 interface. In one embodiment, the SSF specific information elements are detailed below:

SSF ID: The identity of the SSF, either for allocation during the SSF establishment procedure or a special reserved value such as a protocol constant that indicates no SSF association.

SP: Service Parameter with per-packet scope. This is typically not used or even omitted as per-SSF service parameters apply to the whole traffic mix of the SSF and are signaled on the SSF-M 510 interface. However, there may be exceptions, such as urgency indication or other future defined cases, whose transmission should be enabled by the SSF-U 520 interface.

EM: End Marker, indicating that this is the last packet transferred from the Enforcement Points 310A-N to the radio within the corresponding SSF.

With respect to the wire format and bit level SSF header specification, such as the number of bits allocated for various information elements, any particular realization, such as renaming, reordering, merging, or splitting of information elements, should be appreciated as being covered by an embodiment of the present invention.

FIG. 8 is an example flowchart illustrating a method for performing sub-service flow based mapping in the cellular communication system in accordance with an embodiment of the present invention. The operations of FIG. 8 may be performed by a network device, such as the one or more access points 12 and, more particularly, by an enforcement point 310, such as by a SSF-U-plane packet interface (SSF-U) 520 which embodies the apparatus 20. In some embodiments, the operations of FIG. 8 are not limited to any particular network (e.g., cellular systems). For example, non-cellular solutions such as a wireless local area network (WLAN) may be utilized for at least some of the operations, such as to permit the facilitation of the sub-service flow based mapping.

As such, as shown in block 82 of FIG. 8, apparatus 20 may be configured to determine a SSF identifier (ID) associated with at least a portion of a packet. This operation may be performed at a User-plane interface or other interfaces between an enforcement point and a network control system. The apparatus of an example embodiment therefore includes means, such as the processor 22, the communications interface 26 or the like, for receiving or retrieving at least a portion of the packet. In one example embodiment, the SSF ID comprises information associated with QoS or QoE identities of the packet.

As shown in block 84 of FIG. 8, the apparatus 20 may be configured to map the packet to a corresponding radio buffer based on the SSF ID. This operation may be performed upon detecting a specific application session. In some embodiments, each application session may belong to a specific SSF or SF. In some embodiments, application sessions may require dedicated SSF level differentiation. In an example embodiment, the apparatus therefore includes means, such as the processor 22 or the like, for detecting the applications sessions as well as mapping the packet to the corresponding radio buffer based on the SSF ID.

As shown in block 86 of FIG. 8, an apparatus 20 may be configured to relate one or more SSF management actions associated with the packet to the C-plane. For example, the apparatus may be configured to relate the SSF mapping to the C-plane interface. In this regard, the apparatus may be configured to relate the SSF-U interface 520 including the establishment and/or termination of SSFs to the C-plane, such as the SSF-M interface 510. The apparatus of an example embodiment therefore may include means, such as the processor 22, or the like, for applying or enforcing the policies in the context of the actual user plane traffic, services, applications and network or resource status. As such, as shown in block 88 of FIG. 8, an apparatus 20 may also be configured to receive a corresponding QoS or QoE treatment of the packet. In this example embodiment, the apparatus therefore includes means, such as the processor 22, the communication interface 26 or the like, for receiving the corresponding QoS or QoE treatment associated with the packet.

FIG. 8 is a flowchart of an apparatus, method and computer program product according to example embodiments of the invention. FIG. 8 is shown from the perspective of the network device, such as the one or more access points 12 and, more particularly, by an enforcement point 310, such as by a SSF-U-plane packet interface (SSF-U) 520 which embodies the apparatus 20. It will be understood that each block of the flowcharts, and combinations of blocks in the flowchart, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 24 of an apparatus employing an embodiment of the present invention and executed by a processor 22 of the apparatus. It should be appreciated though, that in the various embodiments in which the apparatus 20 is embodied by the communication system of FIG. 1 that the operations illustrated in FIG. 8 may be performed by various system components and interfaces in the communication system of FIG. 1. For example, the operations performed by the processor 22 may be performed by components of the embodiment of FIG. 3 including the enforcement points 310 A-N, components of the embodiment of FIG. 5 including SSF-M interface 510 and SSF-U interface 520, and a Control-plane interface.

As will be appreciated, any such computer program instructions may be loaded onto a computer or other programmable apparatus (for example, hardware) to produce a machine, such that the resulting computer or other programmable apparatus implements the functions specified in the flowchart block(s). These computer program instructions may also be stored in a non-transitory computer-readable memory that may direct a computer or other programmable apparatus to function in a particular manner, such that the instructions stored in the computer-readable memory produce an article of manufacture the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s). As such, the operations of FIG. 8, when executed, convert a computer or processing circuitry into a particular machine configured to perform an example embodiment of the present invention. Accordingly, the operations of FIG. 8 define an algorithm for configuring a computer or processing to perform an example embodiment. In some cases, a general purpose computer may be provided with an instance of the processor which performs the algorithms of FIG. 8 to transform the general purpose computer into a particular machine configured to perform an example embodiment.

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as DVD and the data variants thereof, or CD.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

We claim:

1. A method comprising:
    determining a sub-service flow (SSF) identifier (ID) associated with at least a portion of a packet, wherein the SSF ID comprises information associated with a Quality of Service (QoS) or Quality of Experience (QoE) of the packet;
    marking the packet with the SSF ID;
    mapping the packet to a corresponding radio buffer of a network control system based on the SSF ID; and
    causing one or more SSF management actions associated with the packet on a control plane (C-plane).

2. A method according to claim 1 wherein marking the packet comprises using in-band packet marking to provide the SSF ID.

3. A method according to claim 2 wherein in-band packet marking is used without provision of QoS or QoE information that is applicable to all packets within the same SSF and without per-flow SSF identity signalling.

4. A method according to claim 1 further comprising attaching additional context information including QoS commands to the packet.

5. A method according to claim 1 further comprising, in an instance in which each application session belongs to a respective SSF or a respective service flow (SF), creating a default SSF for traffic that does not require dedicated service within the SF.

6. A method according to claim 1 further comprising, in an instance in which traffic is associated directly with a service flow (SF) itself, detecting an application session that requires dedicated SSF level differentiation and creating an SSF for the application session that requires dedicated SSF level differentiation.

7. A method according to claim 1 further comprising establishing a new SSF; autonomously allocating an SSF ID to the new SSF and marking a packet with the SSF ID for the new SSF prior to completion of a SSF establishment procedure.

8. A method according to claim 1 further comprising tagging the packet with an end marker indication.

9. An apparatus comprising:
    at least one processor; and
    at least one memory including computer program code, wherein the at least one memory and the computer program code are configured to, with the at least one processor, cause the apparatus to:
    determine a sub-service flow (SSF) identifier (ID) associated with at least a portion of a packet, wherein the SSF ID comprises information associated with a Quality of Service (QoS) or Quality of Experience (QoE) of the packet;
    mark the packet with the SSF ID;
    map the packet to a corresponding radio buffer of a network control system based on the SSF ID; and
    cause one or more SSF management actions associated with the packet on a control plane (C-plane).

10. An apparatus according to claim 9 wherein the at least one memory and the computer program code are configured to, with the at least one processor, cause the apparatus to mark the packet by using in-band packet marking to provide the SSF ID.

11. An apparatus according to claim 10 wherein in-band packet marking is used without provision of QoS or QoE information that is applicable to all packets within the same SSF and without per-flow SSF identity signalling.

12. An apparatus according to claim 9 wherein the at least one memory and the computer program code are further configured to, with the at least one processor, cause the apparatus to attach additional context information including QoS commands to the packet.

13. An apparatus according to claim 9 wherein, in an instance in which each application session belongs to a respective SSF or a respective service flow (SF), the at least one memory and the computer program code are further configured to, with the at least one processor, cause the apparatus to create a default SSF for traffic that does not require dedicated service within the SF.

14. An apparatus according to claim 9 wherein, in an instance in which traffic is associated directly with a service flow (SF) itself, the at least one memory and the computer program code are further configured to, with the at least one processor, cause the apparatus to detect an application session that requires dedicated SSF level differentiation and create an SSF for the application session that requires dedicated SSF level differentiation.

15. An apparatus according to claim 9 wherein he at least one memory and the computer program code are further configured to, with the at least one processor, cause the apparatus to establish a new SSF; autonomously allocating an SSF ID to the new SSF and mark a packet with the SSF ID for the new SSF prior to completion of a SSF establishment procedure.

16. An apparatus according to claim 9 wherein the at least one memory and the computer program code are further configured to, with the at least one processor, cause the apparatus to tag the packet with an end marker indication.

17. A computer program product comprising at least one non-transitory computer-readable storage medium having computer-executable program code instructions stored therein, wherein the computer-executable program code instructions comprise program code instructions configured to:

determine a sub-service flow (SSF) identifier (ID) associated with at least a portion of a packet, wherein the SSF ID comprises information associated with a Quality of Service (QoS) or Quality of Experience (QoE) of the packet;
mark the packet with the SSF ID;
map the packet to a corresponding radio buffer of a network control system based on the SSF ID; and
cause one or more SSF management actions associated with the packet on a control plane (C-plane).

18. A computer program product according to claim 17 wherein, in an instance in which each application session belongs to a respective SSF or a respective service flow (SF), the computer-executable program code instructions further comprise program code instructions configured to create a default SSF for traffic that does not require dedicated service within the SF.

19. A computer program product according to claim 17 wherein, in an instance in which traffic is associated directly with a service flow (SF) itself, the computer-executable program code instructions further comprise program code instructions configured to detect an application session that requires dedicated SSF level differentiation and create an SSF for the application session that requires dedicated SSF level differentiation.

20. A computer program product according to claim 17 wherein the computer-executable program code instructions further comprise program code instructions configured to establish a new SSF; autonomously allocate an SSF ID to the new SSF and mark a packet with the SSF ID for the new SSF prior to completion of a SSF establishment procedure.

* * * * *